United States Patent [19]

Fujiwara et al.

[11] Patent Number: 5,133,026

[45] Date of Patent: Jul. 21, 1992

[54] COMPUTER INPUT AND CHARACTER RECOGNITION SYSTEM USING FACSIMILE

[75] Inventors: Kiyokazu Fujiwara, Osaka; Tuneo Owa, Tokyo, both of Japan

[73] Assignee: Kabushiki Kaisha System Yamato, Tokyo, Japan

[21] Appl. No.: 637,065

[22] Filed: Jan. 3, 1991

[30] Foreign Application Priority Data

Jan. 24, 1990 [JP] Japan .................................. 2-12728

[51] Int. Cl.⁵ .......................... G06K 9/20; G06K 9/62; G06K 9/32

[52] U.S. Cl. ....................... 382/61; 382/14; 382/46; 358/464; 358/470

[58] Field of Search ........... 382/61, 14, 34, 46; 358/464, 470

[56] References Cited

U.S. PATENT DOCUMENTS 3,624,607 11/1971 Mita et al. .......................... 382/61
3,801,775 4/1974 Acker ................................. 382/61
4,180,798 12/1979 Komori et al. ...................... 382/14
4,633,507 12/1986 Cannistra et al. ................... 382/61
4,872,062 10/1989 Nanba ................................ 358/443

Primary Examiner—Michael Razavi
Assistant Examiner—Michael Cammarata
Attorney, Agent, or Firm—Flynn, Thiel, Boutell & Tanis

[57] ABSTRACT

A computer input system includes a facsimile machine connected to a computer through an interface. A data sheet which is fed to the facsimile machine includes a character pattern row in which a character pattern of data to be entered into the computer is written, and a standard pattern row in which a standard reference pattern corresponding to the character pattern is written. An identification index is marked on the data sheet, and the character pattern, standard pattern, and identification index are transmitted by the facsimile machine from the data sheet to the computer via the interface. The computer includes an arrangement responsive to the character pattern, the standard pattern and the identification index for recognizing and recording the corresponding relationship between the character pattern and the standard pattern.

14 Claims, 4 Drawing Sheets

COMPUTER INPUT AND CHARACTER RECOGNITION SYSTEM USING FACSIMILE

FIELD OF THE INVENTION

The present invention is concerned with a computer input system which uses a facsimile machine, and relates to a computer input system which is able to exactly enter data into a computer using a specified data sheet and the facsimile machine.

BACKGROUND OF THE INVENTION

Recently information processing has been performed by computer, involving increased amounts of information. Normally, when entering data into a computer, a key on a keyboard as an input medium is operated, or a bar code is read by an automatic optical code reader (OCR). Also, computers and facsimile machines are connected through the aid of interfaces, and data on a data sheet for transmission by facsimile is sometimes entered into a computer.

However, if data is entered into a computer by operating a keyboard, the data must be entered by operating the keys one by one, and thus the operation of data input is very troublesome. For this reason, there has been inconvenience in that the input operation is difficult for unskilled personnel to master and a lot of labor has to be spent even for skilled personnel.

Also, in automatic optical code readers wherein information processing is performed using bar codes, in the case of using devices such as personal computers, there has been inconvenience in that the necessary hardware and software both become expensive.

Further, in the system wherein a computer is connected with a facsimile machine through the aid of an interface, there has been inconvenience in that the computer cannot exactly read the data and thus data processing cannot be steadily performed, particularly if the written data is deformed due to expansion or contraction of the data sheet, or if the data sheet is inserted aslant relative to the feed direction of the facsimile machine.

The object of the present invention is to avoid the above problems by providing a computer input system which uses a facsimile machine and which (1) can be easily and cheaply applied to a personal computer, (2) steadily performs data processing by making the computer exactly read the data, and (3) facilitates the input operation which enters data into the computer without the need for operating a keyboard, by entering data into the computer from a specified data sheet using the facsimile machine.

According to the present invention, a facsimile machine is connected with a computer through the aid of an interface. A data sheet is provided having a character pattern row in which a character pattern of data to be entered is written, a standard pattern row in which a standard pattern related to said character pattern is written, and an identification index whereby a corresponding relationship between said character pattern and standard pattern is identified. The corresponding relationship between the character pattern and standard pattern on said data sheet, which patterns are transmitted to the computer by the facsimile machine through the aid of the interface, is identified by the identification index and at the same time is characteristically considered to be recognized and is entered as data.

Thus when entering data into the computer, operation of a keyboard is unnecessary, and even personnel unskilled in information processing can correctly and easily enter data. Even if the data sheet is inserted aslant when transmitting a specified data sheet by facsimile, the corresponding relation between the read character pattern and standard pattern is considered to be recognized and is entered as data, and so input processing of data can be steadily performed.

BRIEF DESCRIPTION OF THE DRAWINGS

A preferred embodiment of the present invention is described in detail on the basis of the drawings, in which.

DETAILED DESCRIPTION

Figure 1:
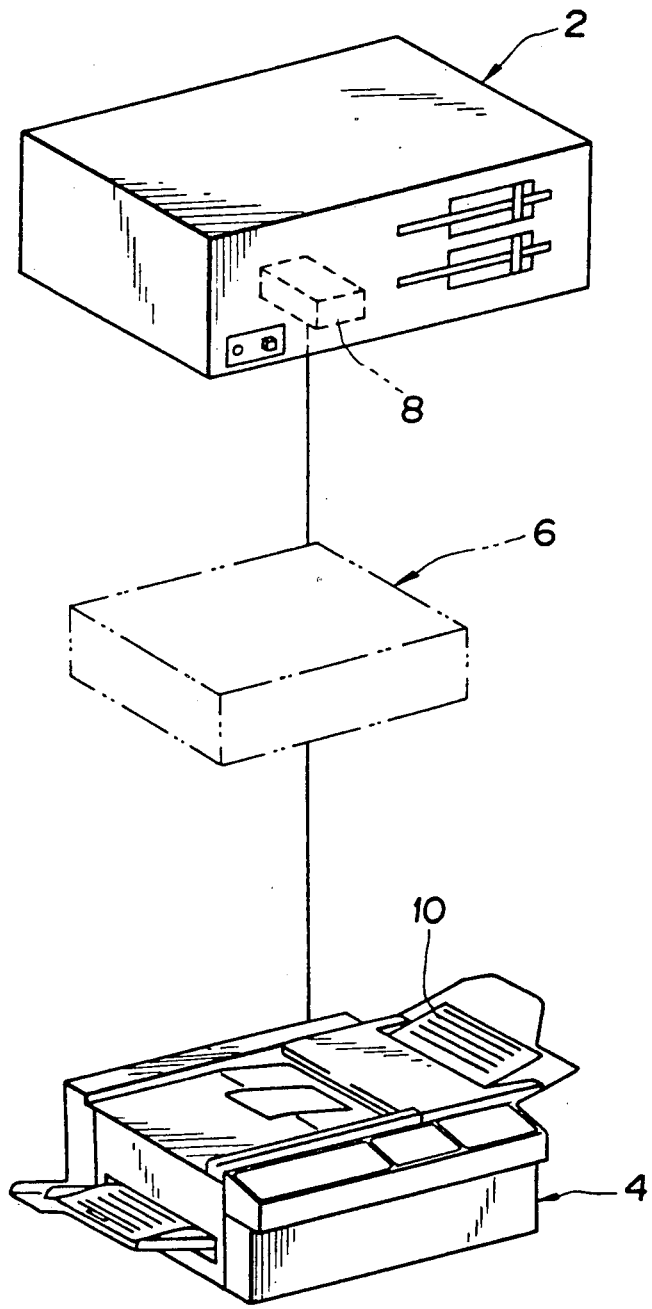
FIG. 1 is a diagram of a known computer input system which uses a facsimile machine.
Figure 2:
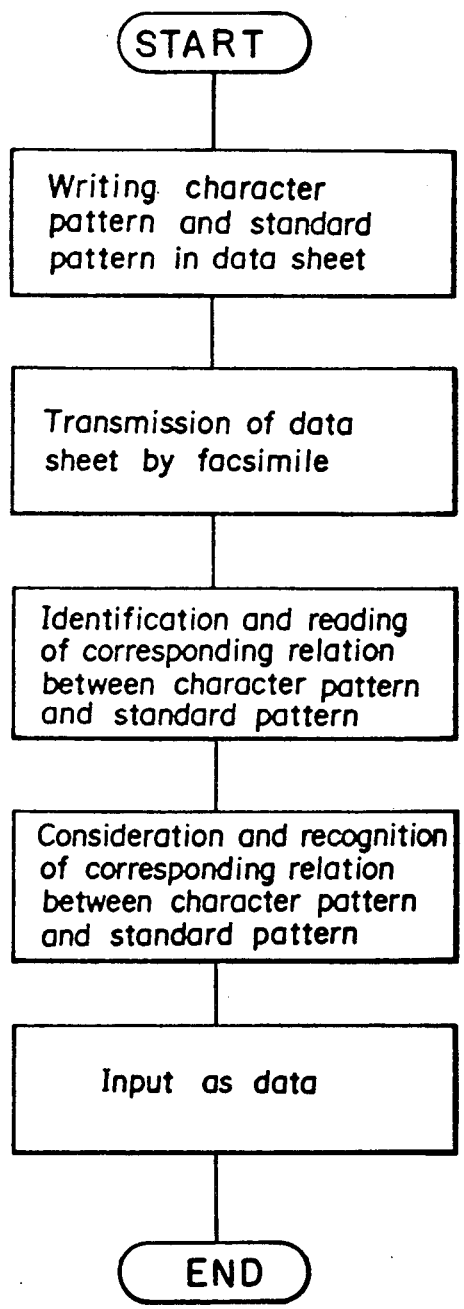
FIG. 2 is a flow chart showing the manner in which data is input to a computer using the present invention.
Figure 3:
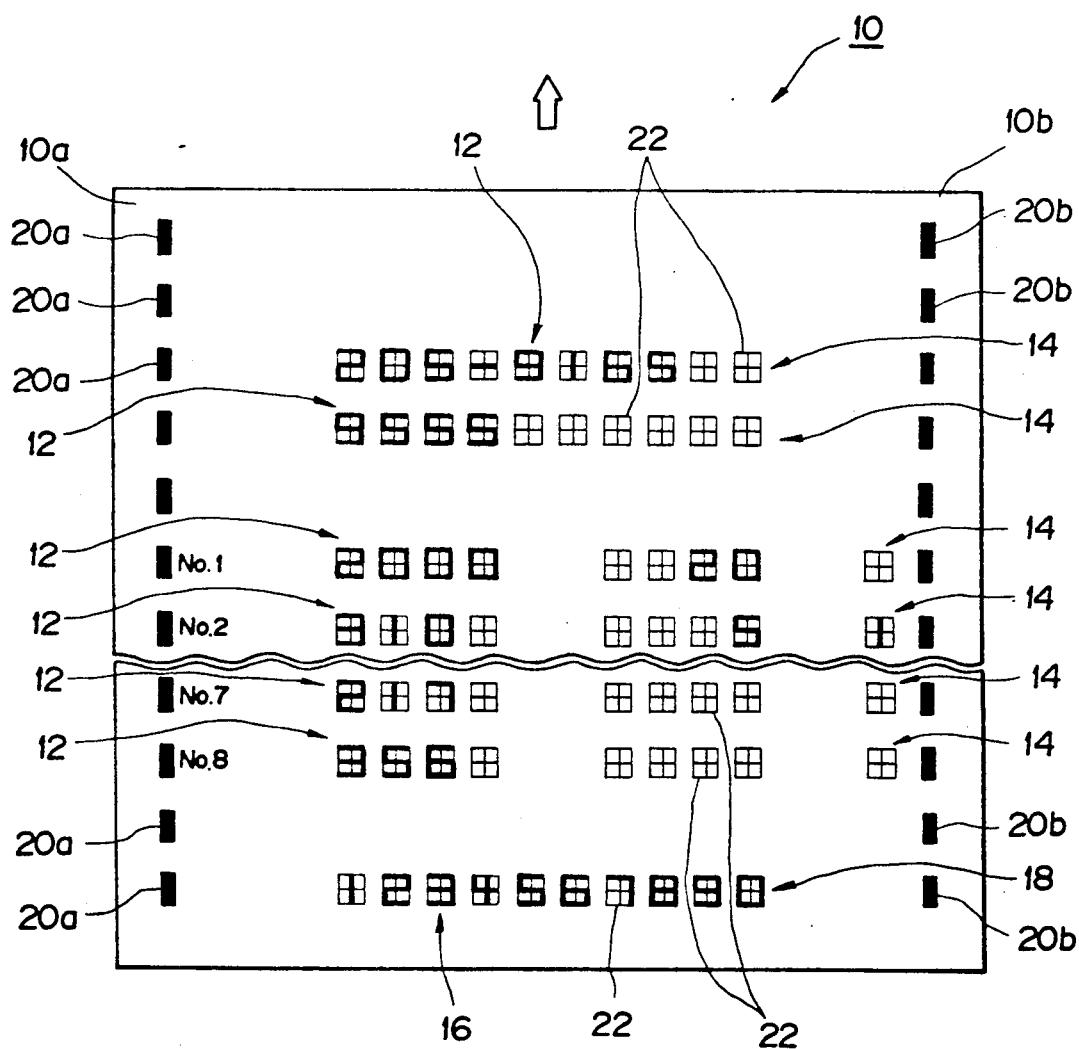
FIG. 3 is a partially broken plan view of a data sheet of the present invention.

FIGS. 1 to 3 will show the preferred embodiment of the present invention.

In FIG. 1, 2 is a computer and 4 is a facsimile machine. Computer 2 and facsimile machine 4 are connected through the aid of an interface 6. By this interface 6 and by facsimile machine 4, data is transmitted and entered into computer 2. A recognition circuit 8 is included in this computer 2.

Data to be entered into said computer 2 is entered from a data sheet 10 as shown in FIG. 3. The data sheet 10 includes plural character pattern rows 14 in which character patterns 12 such as digits, for example, can be entered, a standard pattern row 18 having standard patterns 16 marked thereon, which standard patterns 16 serve as regular reference patterns which correspond to the digits of said character patterns 12, and an identification index 20 marked on the sheet 10, which identifies corresponding relationships between said character patterns 12 and standard patterns 16. The rows 14 and 18, and the index 20 are set up in the arrangement specified in FIG. 3.

In said character pattern rows 14 and standard pattern row 18, a guide pattern 22 such as a character stamp of " ⊞ ", for example, serves as a guide when writing the character patterns 12 and standard patterns 16, and is printed with ink which cannot be read by the facsimile machine 4.

In this embodiment, said identification index 20 is set up at equal intervals along the feeding direction (see arrow in FIG. 3) of data sheet 10, and includes a pair of identification markers 20a and 20b located in symmetric positions on both the left and right sides 10a and 10b of the sheet 10 relative to the feeding direction. The character pattern rows 14 and standard pattern row 18 are set up respectively between pairs of the identification markers 20a and 20b which are placed at equal intervals along the feeding direction of data sheet 10. According to this, identification index 20 makes computer 2 identify and read the corresponding relationship between the character patterns 12 and the standard patterns 16 as explained below.

On transmitting the data on said data sheet 10 by facsimile 4, the character patterns 12 and standard patterns 16 are entered into computer 2 through the aid of interface 6. In computer 2, by recognition circuit 8, the corresponding relationship between the character patterns 12 and standard patterns 16 on said data sheet 10 is identified using the identification index 20 which is also read into the computer 2. At the same time, the corresponding relationship between the character patterns 12 and standard patterns 16 which have been read is considered to be recognized and is entered as data. That is, the computer 2 associates each character pattern 12 with the corresponding standard pattern 16.

Figure 4:
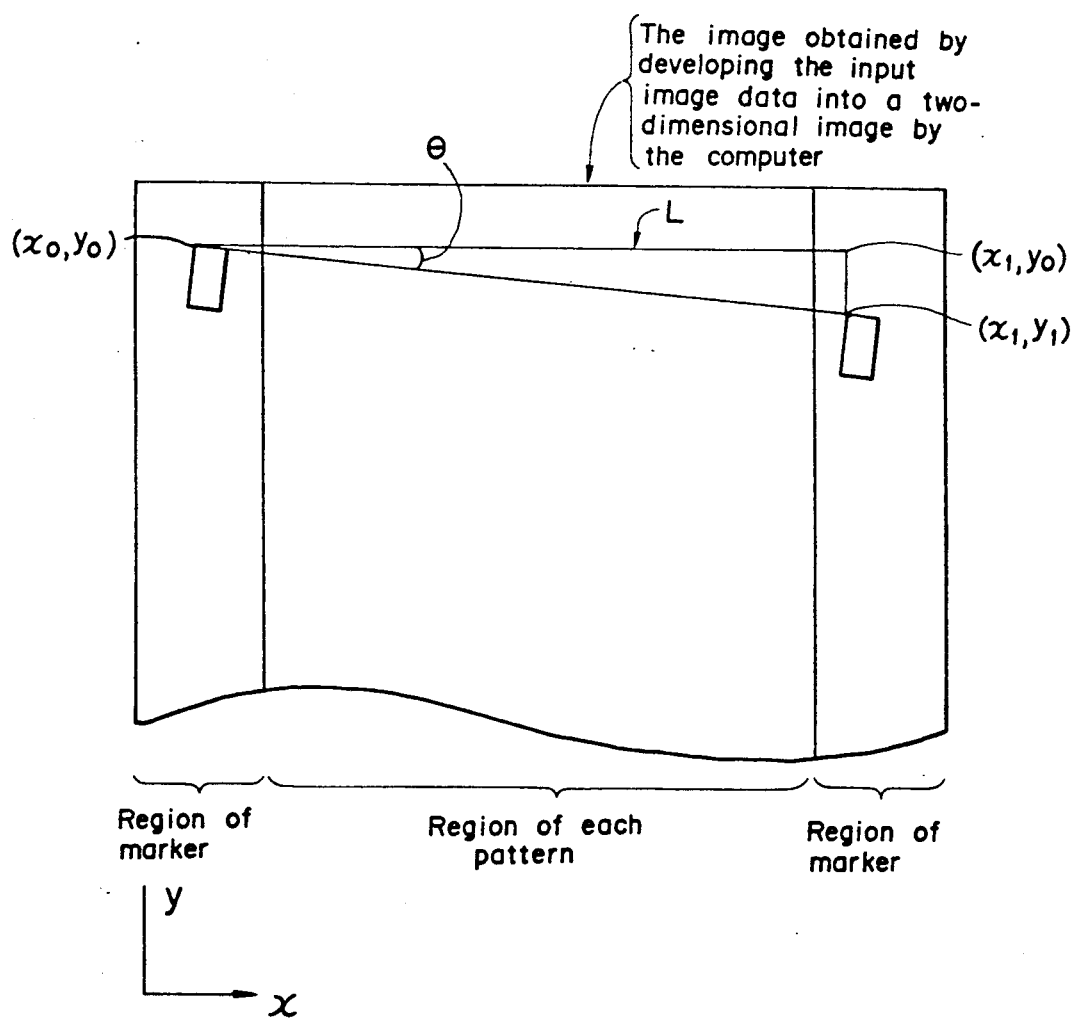
FIG. 4 illustrates the geometric relationship between the identification markers of the present invention when the data sheet is slanted relative to its feed direction.

Each of the markers 20a and 20b has a rectangular shape of predetermined width and length and is printed or otherwise marked at a special position on the data sheet 10. In the case where the data was transmitted in a state in which the data sheet 10 is set in an oblique position (i.e. slanted relative to the feeding direction), the marker pairs 20a and 20b which were input to the computer 2 are stored into memory as images in an oblique state as shown in FIG. 4. Assuming that the start (upper left in this example) coordinates of the left marker 20a in the memory are set to $(x_0, y_0)$ and the start coordinates of the right marker 20b are set to $(x_1, y_1)$, an angle $\Theta$ of inclination is expressed by $\tan\Theta = (y_1 - y_0)/(x_1 - x_0)$, or $\Theta = \tan^{-1}(y_1 - y_0)/(x_1 - x_0)$. The oblique state or slant of the data sheet relative to its feed direction is defined by the detected inclination angle $\Theta$. In this example, line L connecting points $(x_0, y_0)$ and $(x_1, y_0)$ of markers 20a and 20b is perpendicular to the feed direction (y) of data sheet 10. The angle $\Theta$ associated with each pattern row 14 and 18 also defines the slant of the characters in that particular row relative to the feed direction y.

The pairs of markers 20a and 20b are printed on the data sheet 10 at the symmetrical positions on both the left and right side portions 10a and 10b with respect to the paper feeding direction. Each pair of markers 20a and 20b is formed in the feeding direction at regular intervals. With each of the pattern rows 14 and 18 between the respective marker pairs 20a and 20b having n digits (i.e. n character patterns 12 and n standard patterns 16), the coordinates of the pattern to be analyzed are obtained by $$\left(x_0 + \frac{x_1 - x_0}{n}, y_0 + \frac{y_1 - y_0}{n}\right).$$

With respect to the y direction, the left markers 20a are sequentially detected in the feeding direction of the data sheet 10, whereby the computer 2 obtains reference points for each of the rows 14 and 18 by updating $x_0$ and $y_0$. The angle $\Theta$ and the coordinates of any desired character pattern 12 or standard pattern 16 are calculated by the computer 2. By determining the coordinates and slant angle $\Theta$ of a particular pattern 12 or 16, that pattern can be stored in memory as a two-dimensional image. The computer 2 uses these two-dimensional images to associate the character patterns 12 with the corresponding standard pattern 16.

The operation of the preferred embodiment is described below and illustrated in FIG. 2.

First of all, the character patterns 12 of data to be entered, and the standard patterns 16 showing a regular reference pattern corresponding to the character patterns 12, are written in the character pattern rows 14 and the standard pattern row 18, respectively, on data sheet 10.

Next, data sheet 10 on which character patterns 12 and standard patterns 16 are written is fed to facsimile machine 4, as shown in FIG. 2, and the data is transmitted.

The facsimile machine 4 recognizes the whole data of the patterns 12 and 16 and the markers 20a and 20b written on the data sheet 10 as image data and transmits this data. The data corresponding to the patterns 12 and 16 and the markers 20a and 20b on the data sheet 10 is transmitted as the whole image data from the facsimile machine 4 to the computer 2 through the interface 6. The computer 2 receives the image data and stores it in the form of a two-dimensional image. For example, each standard pattern 16 and character pattern 12 can be stored as a two dimensional image in computer 2. The computer 2 has therein a recognizing circuit 8 for recognizing the image data. The whole image data of the data sheet 10 which was input to the computer 2, including every pattern 12 and 16 written between the pairs of markers 20a and 20b, is recognized by the recognizing circuit 8 and is stored as data.

In computer 2, using recognition circuit 8, the corresponding relationship between character patterns 12 and standard patterns 16 on said data sheet 10 is identified using identification index 20.

Having been read by the computer 2, character patterns 12 and standard patterns 16 are entered as data, while the respective corresponding relationships are considered to be recognized.

Accordingly, in entering data to computer 2, conventional operation of a keyboard is unnecessary and even personnel unskilled in information processing can correctly and easily transmit information from a specified data sheet 10 to the computer 2 via facsimile machine 4. If data sheet 10 is aslant or otherwise out of proper position, since the character pattern rows 14 and the standard pattern row 18 are registered with identification index 20 at equal intervals along the feeding direction, character patterns 12 and standard patterns 16 are both transmitted in the same slanted orientation, and the corresponding relationship between character patterns 12 and standard patterns 16 is considered to be recognized and can be entered as data, so that input processing of data can be steadily performed.

Further, since the character patterns 12 and standard pattern 16 are arranged in single rows, the character patterns 12 and standard pattern 16 themselves can also function as an identification index.

And either one of the identification markers 20a and 20b can also be located near the middle of the character pattern rows 14 and standard pattern row 18.

Further, Chinese characters, hiragana characters, katakana characters, alphabets, figures, and other symbols in addition to digits can also be used as character patterns 12 and standard patterns 16.

Moreover, by allowing computer 2 to store standard patterns 16 which variously correspond to the character patterns 12, standard pattern row 18 on data sheet 10 can be deleted.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A computer input system, comprising: a facsimile machine connected with a computer through the aid of an interface, and including a data sheet having a character pattern area in which a character pattern of data to be entered is written, a standard pattern area in which a standard reference pattern corresponding to said character pattern is written, and an identification index marked on said data sheet for delineating said areas, whereby said character pattern, said standard pattern, and said identification index are transmitted by said facsimile machine from said data sheet to said computer through the aid of said interface, said computer including means responsive to said character pattern, said standard pattern and said identification index for recording said character pattern, said standard pattern, and said identification index, and for recognizing said character pattern by matching said character pattern with said standard pattern.

2. A computer input system according to claim 1, wherein said identification index includes a pair of markers marked on said data sheet at respectively spaced locations, said character pattern area having a plurality of said character patterns arranged linearly on a line defined by said pair of markers, and each of said markers defining a predetermined shape on said data sheet.

3. A computer input system according to claim 1, wherein said facsimile machine includes driving means for feeding the data sheet through the facsimile machine in a feed direction, said data sheet having a plurality of said character patterns written thereon in said character pattern area, said character patterns being arranged in a generally linear configuration, said computer including means cooperable with said identification index for detecting when the data sheet has been fed through the facsimile machine in an incorrect orientation relative to the feed direction, means for determining an offset between adjacent said character patterns in said feed direction in response to a detected incorrect orientation of said data sheet, and means for determining an offset between adjacent said character patterns in a direction perpendicular to said feed direction in response to a detected incorrect orientation of said data sheet.

4. A computer input system according to claim 3, wherein said data sheet has a plurality of said standard reference patterns written thereon in said standard pattern area, said standard reference patterns being arranged in a generally linear configuration, said computer including means for determining an offset between adjacent said standard reference patterns in said feed direction in response to a detected incorrect orientation of said data sheet, and means for determining an offset between adjacent said standard reference patterns in said direction perpendicular to said feed direction in response to a detected incorrect orientation of said data sheet.

5. A computer input system according to claim 4, wherein said identification index includes a pair of markers marked on said data sheet and spaced from each other, said markers defining a line which extends generally parallel to both said linearly configured plurality of standard reference patterns and said linearly configured plurality of character patterns, and said means for detecting an incorrect data sheet orientation including means for detecting when the data sheet has been fed through the facsimile machine with said marks offset from each other in said feed direction.

6. A computer input system according to claim 1, including a plurality of visible guide patterns provided in both said areas of said data sheet to assist in writing a plurality of character patterns and standard reference patterns in the respective areas of said data sheet, said character pattern area and said standard pattern area being defined on said data sheet in nonoverlapping relationship relative to one another to permit the computer to distinguish standard reference patterns from character patterns.

7. A computer input system according to claim 6, wherein said facsimile machine includes driving means for feeding the data sheet through the facsimile machine in a feed direction, said data sheet having a plurality of said character patterns written thereon in said character pattern area, said character patterns being arranged in a generally linear configuration, said computer including means cooperable with said identification index for detecting when the data sheet has been fed through the facsimile machine in an incorrect orientation relative to the feed direction, means for determining an offset between adjacent said character patterns in said feed direction in response to a detected incorrect orientation of said data sheet, and means for determining an offset between adjacent said character patterns in a direction perpendicular to said feed direction in response to a detected incorrect orientation of said data sheet.

8. A computer input system according to claim 7, wherein said data sheet has a plurality of said standard reference patterns written thereon in said standard pattern area, said standard reference patterns being arranged in a generally linear configuration , said computer including means for determining an offset between adjacent said standard reference patterns in said feed direction in response to a detected incorrect orientation of said data sheet, and means for determining an offset between adjacent said standard reference patterns in said direction perpendicular to said feed direction in response to a detected incorrect orientation of said data sheet.

9. A computer input system according to claim 8, wherein said identification index includes a pair of markers marked on said data sheet and spaced from each other, said markers defining a line which extends generally parallel to both said linearly configured plurality of standard reference patterns and said linearly configured plurality of character patterns, and said means for detecting an incorrect data sheet orientation including means for detecting when the data sheet has been fed through the facsimile machine with said marks offset from each other in said feed direction.

10. A method for inputting information into a digital circuit which processes information in the form of digital data, comprising the steps of:
providing a facsimile machine, and connecting the facsimile machine to the digital circuit via an interface means;
providing a data sheet suitable for use with the facsimile machine;
marking a set of reference symbols onto a first predetermined area of the data sheet;
selecting from the reference symbols a plurality of message symbols, and arranging the message symbols to compose a desired message;

marking the message onto a second predetermined area of the data sheet which does not overlap the first predetermined area;

feeding the data sheet through the facsimile machine for transmission of the message and the reference symbols through the interface means and ultimately to the digital circuit; and recognizing said message symbols by matching said message symbols with said reference symbols.

11. The method according to claim 10, including the further steps of:

determining that the data sheet was incorrectly oriented relative to the facsimile machine during said data sheet feeding step;

thereafter, determining the actual, incorrect orientation which the data sheet occupied relative to the facsimile machine during said data sheet feeding step;

using the actual orientation of the data sheet to determine where the reference symbols were positioned relative to the facsimile machine during said data sheet feeding step; and using the actual orientation of the data sheet to determine where the message symbols were positioned relative to the facsimile machine during said data sheet feeding step.

12. The method according to claim 11, including the further steps of:

using the actual data sheet orientation to determine how the reference symbols were oriented relative to the facsimile machine during said data sheet feeding step; and using the actual data sheet orientation to determine how the message symbols were oriented relative to the facsimile machine during said data sheet feeding step.

13. The method according to claim 12, including the further step of determining corresponding relationships between the reference symbols and the message symbols.

14. The method according to claim 11, including the further step of determining corresponding relationships between the reference symbols and the message symbols.

* * * * *